US010669995B2

(12) United States Patent
Andresen et al.

(10) Patent No.: US 10,669,995 B2
(45) Date of Patent: Jun. 2, 2020

(54) SUPPORT STRUCTURE FOR A WIND TURBINE BLADE

(71) Applicant: SIEMENS GAMESA RENEWABLE ENERGY, Brande (DK)

(72) Inventors: Peter Andresen, Holstebro (DK); Witold Zareba, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 16/194,495

(22) Filed: Nov. 19, 2018

(65) Prior Publication Data

US 2019/0154006 A1 May 23, 2019

(30) Foreign Application Priority Data

Nov. 21, 2017 (EP) .................................... 17202862

(51) Int. Cl.
*F16M 13/00* (2006.01)
*F03D 13/40* (2016.01)
(Continued)

(52) U.S. Cl.
CPC .............. *F03D 13/40* (2016.05); *B66C 1/108* (2013.01); *F03D 13/20* (2016.05); *F05B 2230/60* (2013.01); *F05B 2260/02* (2013.01)

(58) Field of Classification Search
CPC ...... F03D 13/40; F05B 2230/60; F16M 13/02
(Continued)

(56) References Cited

U.S. PATENT DOCUMENTS 8,708,625 B1* 4/2014 Landrum ................. B61D 3/16
410/44
9,732,726 B2* 8/2017 Botwright ................. B60P 3/40
(Continued)

FOREIGN PATENT DOCUMENTS

CN 1659375 A 8/2005
CN 1882456 A 12/2006
(Continued)

OTHER PUBLICATIONS

Extended European Search Report dated May 25, 2018 for Application No. 17202862.3.
(Continued)

*Primary Examiner* — Todd M Epps
(74) *Attorney, Agent, or Firm* — Schmeiser, Olsen & Watts LLP

(57) ABSTRACT

Provided is a support structure for a wind turbine blade and a method for manufacturing a support structure for a wind turbine blade The support structure includes a frame structure including a first section and a second section which are spaced apart with respect to each other along a first direction such that a section of a wind turbine blade is arrangeable in-between the first section and the second section. The support structure further includes two seesaw elements being pivotably fixed to a respective section and having a respective pivoting axis parallel to the first direction and four belt elements being fixed with their respective first end to a respective end of the respective seesaw element Furthermore, a respective second end of the respective belt element are each fixed to the respective other section of the frame structure.

15 Claims, 7 Drawing Sheets

(51) Int. Cl.
*B66C 1/10* (2006.01)
*F03D 13/20* (2016.01)

(58) Field of Classification Search
USPC ............... 410/44; 248/560; 264/40.1, 311; 416/244 R
See application file for complete search history.

(56) References Cited

U.S. PATENT DOCUMENTS

| | | |
|---|---|---|
| 2005/0002749 A1 | 1/2005 | Andersen et al. |
| 2005/0258064 A1 | 11/2005 | Wobben |
| 2007/0177954 A1 | 8/2007 | Kootstra et al. |
| 2016/0009005 A1* | 1/2016 | Dixon .................. B29C 33/505 264/40.1 |
| 2016/0053740 A1 | 2/2016 | Landrum |
| 2017/0002797 A1* | 1/2017 | Chen .................... F03D 1/0675 |

FOREIGN PATENT DOCUMENTS

| | | |
|---|---|---|
| CN | 101012021 A | 8/2007 |
| CN | 204297338 U | 4/2015 |
| DE | 202016100449 U1 | 5/2017 |
| EP | 1925583 A1 | 5/2008 |
| WO | 03076307 A1 | 9/2003 |
| WO | 2017071719 A1 | 5/2017 |
| WO | WO 2017131515 A1 | 8/2017 |

OTHER PUBLICATIONS

Examination Report in Chinese Patent Application No. 201811392384.0, dated Nov. 19, 2020.

* cited by examiner

SUPPORT STRUCTURE FOR A WIND TURBINE BLADE

CROSS REFERENCE TO RELATED APPLICATIONS

This application claims priority to European application 17202862.3 having a filing date of Nov. 21, 2017, the entire contents of which are hereby incorporated by reference.

FIELD OF TECHNOLOGY

The following relates to the field of decreasing damages and hence costs during long-term storage of turbine blades and increasing the flexibility of supporting different blade types. Particularly, the present embodiments of the invention relates to a support structure for a wind turbine blade and a method for manufacturing a support structure for a wind turbine blade.

BACKGROUND

In current storage and transportation solutions for wind turbine blades, a complex clamping equipment for storage and transportation is used. Furthermore, up till now, there were developed individual transport and storage equipment for every different wind turbine blade size.

Today, the weight of wind turbine blades during storage and transportation may not be supported evenly in the transport and storage equipment. As a consequence, the load is not evenly distributed to all of the cross slings. When the load of the wind turbine blade is not evenly distributed in the storage and transportation equipment, a risk of damaging the wind turbine blade may occur.

In known wind turbine blade rack systems, the blade may be supported by four cross slings. The load distribution between the four cross slings may be controlled by adjusting the sling lengths via turn buckles and it may be up to the technician to judge when the load is equally distributed. However, this may not be an easy task, since the technician cannot measure the tension in each cross sling. Hence, it may not be ensured a perfectly distributed load.

Furthermore, if the wind turbine blade starts to move due to dynamic loading, the system may not adapt to this new load scenario and the wind turbine blade may be locally overloaded.

Additionally, it may be challenging that each wind turbine blade type has different shapes and sizes, which may require individual equipment being fitted to the exact wind turbine blade geometry.

The repair costs for damages of the wind turbine blades during storage and transportation as well as the costs for handling and adjusting the current storage system add to the total costs of the wind turbine blade.

SUMMARY

An aspect relates to a simple and reliable support structure for a wind turbine blade which is able to reduce manual handling and adjustment costs and to reduce damages of the wind turbine blade.

According to a first aspect of the embodiments of the present invention, a support structure for a wind turbine blade is described. The support structure comprises a frame structure comprising a first section and a second section which are spaced apart with respect to each other along a first direction such that a section of a turbine blade is arrangeable in-between the first section and the second section, a first seesaw element being pivotably fixed to the first section, and having a first pivoting axis parallel to the first direction, and a second seesaw element being pivotably fixed to the second section, and having a second pivoting axis parallel to the first direction. Furthermore, the support structure comprises a first belt element being fixed with its first end to a first end of the first seesaw element, a second belt element being fixed with its first end to a first end of the second seesaw element, a third belt element being fixed with its first end to a second end of the first seesaw element, and a fourth belt element being fixed with its first end to a second end of the second seesaw element. The first end and the second end of the first seesaw element are on opposite sides relatively to the first pivoting axis, and the first end and the second end of the second seesaw element are on opposite sides relatively to the second pivoting axis. Additionally, a second end of the first belt element and a second end of the third belt element are each fixed to the second section of the frame structure, as well as a second end of the second belt element and a second end of the fourth belt element are each fixed to the first section of the frame structure.

The first section and the second section are spaced apart from each other along the first direction such that a section of a wind turbine blade being supported by the support structure, may be inserted in-between the first section and the second section. The section of the wind turbine blade being inserted in-between the first section and the second section may particularly be a wind turbine blade tip. Particularly, the first section and the second section may have identical geometries and may be mirror images of each other.

Additionally, the frame structure may further comprise the at least one cross-member, in particular at least one cross-beam, for inter-connecting the first section and the second section.

The first direction may be defined as extending from the first section of the frame structure to the second section of the frame structure.

The second direction may be perpendicular to the first direction. At the same time the second direction may be perpendicular to a height of the frame structure. The height of the frame structure may extend from a support area of the support structure, at which the frame structure is positioned on an underground, preferably the ground. In other words, the second direction may extend along a longitudinal extension of the wind turbine blade from a wind turbine blade root to a wind turbine blade tip, when the wind turbine blade is inserted in the frame structure.

The first seesaw element may have a longitudinal extension being defined from its first end to its second end, which may in a balanced orientation be parallel to the second direction. Furthermore, the first pivoting axis of the first seesaw element may be parallel to the first direction, and hence perpendicular to the second direction. The first seesaw element may be pivotably fixed to the first section at a center point of the first seesaw element seen in the second direction. By pivotably fixing the first seesaw element at its center point, the first seesaw element may be able to equalize loads acting on the one hand on its first end and on the other hand on its second end.

The second seesaw element may likewise have a longitudinal extension being defined from its first end to its second end, which may in a balanced orientation be parallel to the second direction. Furthermore, the second pivoting axis of the second seesaw element may be parallel to the first direction, and hence perpendicular to the second direction.

Hence, the first seesaw element and the second seesaw element may extend parallel to each other in a balanced orientation. The second seesaw element may be pivotably fixed to the second section at a center point of the second seesaw element. By pivotably fixing the second seesaw element at its center point, the second seesaw element may be able to equalize loads acting on the one hand on its first end and on the other hand on its second end.

The first belt element and the third belt element may be fixed to a respective end of the first seesaw element. Hence, a first load acting on the first belt element and a second load acting on the third belt element may be equalized by a pivoting movement of the first seesaw element around the first pivoting axis.

The second belt element and the fourth belt element may be fixed to a respective end of the second seesaw element. Hence, a first load acting on the second belt element and a second load acting on the fourth belt element may be equalized by a pivoting movement of the second seesaw element around the second pivoting axis.

The respective belt element may be fixed to the respective end of the seesaw element by a mechanism allowing a relative movement between the belt element and the seesaw element.

The second end of the first belt element and the second end of the third belt element may be fixed, particularly unmovably fixed, to the second section such that the first belt element and the third belt element each span the distance between the first section and the second section. Furthermore, the second end of the second belt element and the second end of the fourth belt element may be fixed, particularly unmovably fixed, to the first section such that the second belt element and the fourth belt element each span the distance between the second section and the first section. Therefore, the wind turbine blade section may abut on the first belt element, the second belt element, the third belt element, and the fourth belt element. Furthermore, the load in each of the first belt element, the second belt element, the third belt element, and the fourth belt element are equalized by a pivotable movement of the pivotably fixed first seesaw element and the pivotably fixed second seesaw element, respectively.

In other words, the wind turbine blade is supported by four belt elements that may be coupled two by two by means of two seesaw elements, wherein each seesaw element may automatically equalize a load difference between the two belt elements. Furthermore, the two seesaw elements may additionally eliminate the need of having matching belt element lengths.

Particularly, each seesaw element with two belt elements may be connected to the frame structure in a center point or pivot of the seesaw element on both sides of the supported wind turbine blade. The belt elements may particularly be at a first end connected to one end of the seesaw element and in an opposite end (second end of the belt element) connected to an arm or similar frame part of the frame structure (the first section or the second section) supporting the wind turbine blade. The frame structure, the two seesaw elements and the four belt elements may particularly support a tip part of the wind turbine blade. The root part of the wind turbine blade on the other hand, may be supported by in any known way by e.g. a frame support and/or bracket support, e.g. connected by slings or bolts or similar connections.

According to a further aspect of the present embodiments of the invention, a method for manufacturing a support structure is described. The method comprises providing a frame structure comprising a first section and a second section which are spaced apart with respect to each other along a first direction such that a section of a turbine blade is arrangeable in-between the first section and the second section, pivotably fixing a first seesaw element to the first section, wherein the first seesaw element has a first pivoting axis parallel to the first direction, and pivotably fixing a second seesaw element to the second section, wherein the second seesaw element has a second pivoting axis parallel to the first direction. Furthermore, the method comprises fixing a first belt element with its first end to a first end of the first seesaw element, fixing a second belt element with its first end to a first end of the second seesaw element, fixing a third belt element with its first end to a second end of the first seesaw element, and fixing a fourth belt element with its first end to a second end of the second seesaw element. The first end and the second end of the first seesaw element are on opposite sides relatively to the first pivoting axis, the first end and the second end of the second seesaw element are on opposite sides relatively to the second pivoting axis. Furthermore, a second end of the first belt element and a second end of the third belt element are each fixed to the second section of the frame structure, and a second end of the second belt element and a second end of the fourth belt element are each fixed to the first section of the frame structure.

According to a further aspect of the present embodiments of the invention, a method for transportation and/or storage of a wind turbine blade is described. According to the method, the wind turbine blade is supported by a above-described support structure.

Advantageously, the loading type of the seesaw element, either dynamic or static, ensures an evenly loaded distribution between the four belt elements at all times. The seesaw elements may furthermore eliminate the influence of belt tolerances and belt elongation since it may automatically equalize a load difference between the two belt elements fixed to one seesaw element. Additionally, providing the seesaw elements may reduce the costs spend on labour since the above-described support structure may not require manual handling or adjustment. Furthermore, the two seesaw elements may each equalize the loads on the two belt elements being fixed to one common seesaw element. Particularly, the flexibility of the belt elements together with the two seesaw elements may make it possible to use the support structure for transporting and storing of different wind turbine blade geometries without causing damages to the wind turbine blade. Therefore, the costs spend on repairing the wind turbine blade after long-term storage may be reduced.

According to a further exemplary embodiment of the present embodiments of the invention, the first pivoting axis is arranged at the frame structure at a first height with respect to a support area of the support structure, wherein the second end of the first belt element is fixed to the second section of the frame structure at a third height with respect to the support area, and the second end of the third belt element is fixed to the second section of the frame structure at the third height. Furthermore, the first height is larger than the third height.

The support area of the support structure may be the part of the support structure which is in contact with a holding surface. The holding surface may be the ground or a shelf, if the support structure is disposed for example in a storage. The holding surface may further be for example the floor of a loading platform of a truck or a ship. However, the holding surface may alternatively be an upper part of another support structure, if two or more support structures are arrange one on top of each other.

The height may be measured as the perpendicular line extending between the respective points, for example the pivoting axis or the fixation of the belt to one section of the frame structure, on the frame structure and the support area.

The first height being larger than the third height may define that the first pivoting axis is distanced farer away from the support area than the point of fixation of the first belt element and the point of fixation of the third belt element. Therefore, the first belt element and the third belt element may extend from a respective end the first seesaw element either to the fixation of the first belt or the fixation of the third belt, and may each extend in the shape of a parabolic arc.

The fixation of the first belt element and the third belt element having the same third height may according to the embodiments of the invention mean that if the first seesaw element is balanced, the shape of a parabolic arc of the first belt element and the shape of a parabolic arc of the third belt element are identic.

According to a further exemplary embodiment of the present invention, the second pivoting axis is arranged at the frame structure at a second height with respect to a support area of the support structure, wherein the second end of the second belt element is fixed to the frame structure at a fourth height with respect of the support area, and the second end of the fourth belt element is fixed to the frame structure at the fourth height, and wherein the second height is larger than the fourth height.

The second pivoting axis may be provided identical to the first pivoting axis. Corre-spondingly, the second end of the second belt element and the second end of the fourth belt element, respectively, is fixed to the frame structure identical to the second end of the first belt element and the second end of the second belt element, respectively.

Particularly, the second height being larger than the fourth height may define that the second pivoting axis is distanced farer away from the support area than the point of fixation of the second belt element and the point of fixation of the fourth belt element. Therefore, the second belt element and the fourth belt element may extend from a respective end the second seesaw element either to the fixation of the second belt or the fixation of the fourth belt, and may extend in the shape of a parabolic arc.

The fixation of the second belt element and the fixation of the fourth belt element having the same fourth height may according to the embodiments of the invention mean that if the second seesaw element is in a balanced orientation, the shape of a parabolic arc of the second belt element and the shape of a parabolic arc of the fourth belt element are identic.

According to a further exemplary embodiment of the present invention, the first height and the second height are equal, and/or the third height and the fourth height are equal.

The first height and the second height being equal means according to the exemplary embodiment that the first pivoting axis and the second pivoting axis are distanced from the support area by the same distance and are arranged on the frame structure at a similar height.

The third height and the fourth height being equal means according to the exemplary embodiment that the fixation of the second end of the first belt element on the second section of the frame structure and the fixation of the third belt element on the second section of the frame structure as well as the fixation of the second belt element on the first section of the frame structure and the fixation of the fourth belt element on the first section of the frame structure may all four be arranged at the same height measured relatively to the support area.

Therefore, if the first height and the second height are equal and at the same time the third height and the fourth height are equal, each of the belt elements extends in the shape of a parabolic arc. Hence, four parabolic arcs, two having a higher end on the first section and two having a higher end on the second section, may be provided.

By providing each of the four belt elements extends in the shape of a parabolic arc between a higher starting point and a lower target point, the supported wind turbine blade may not tilt from right to left and vice versa seen in a cross sectional view having a normal being parallel to the second direction.

According to a further exemplary embodiment of the present invention, the support structure further comprises a first deflexion element for deflecting the first belt element, and a third deflexion element for deflecting the third belt element. The first belt element extends from the first end of the first seesaw element deflected around the first deflexion element to the second section, and the third belt element extends from the second end of the first seesaw element deflected around the third deflexion element to the second section.

According to a further exemplary embodiment of the present invention, the support structure comprises a second deflexion element for deflecting the second belt element, and a fourth deflexion element for deflecting the fourth belt element. Furthermore, the second belt element extends from the first end of the second seesaw element deflected around the second deflexion element to the first section, and the fourth belt element extends from the second end of the second seesaw element deflected around the fourth deflexion element to the first section.

The first deflecting element and the third deflecting element may each extend parallel to the second direction. Therefore, the first deflection element and the third deflection element may each extend parallel to the extension of the first seesaw element when being in a balanced orientation.

Extending deflected around the deflexion element means according to the present application that the belt element is fixed with its first end to one end of the seesaw element and with its second end to a fixation on the other section of the frame structure. Between its two ends, the belt element extends in one direction to the deflection element and is deflected around the deflection element by an angle of at least 270°, particularly by an angle of at least 302°, more particularly by an angle of at least 335.

By deflecting the belt element around the deflection element, different tensions on two belt elements fixed to two different ends of one seesaw element may be easily balanced. Additionally, the load caused by the supported wind turbine blade acting on the seesaw element may be reduced due to the same effect as in a pulley.

According to a further exemplary embodiment of the present invention, the first deflexion element and the third deflexion element are fixed to the frame structure at a fifth height with respect to a support area of the support structure, and/or the second deflexion element and the fourth deflexion element are fixed at the frame structure at a sixth height with respect to the support area.

The first deflexion element and the third deflexion element are fixed to the frame structure at the same height particularly mean that if the first seesaw element is in a balanced orientation, the extension between the fixation of the first belt element on the first end of the first seesaw element and the first deflexion element and the extension between the fixation of the third belt element on the second end of the first seesaw element and the third deflexion element are equal. Hence, the first belt element and the third belt element may be provided identical and fixed to two different positions on the second section of the frame structure and the first seesaw element. Therefore, lower manufacturing costs for the first belt element and the third belt element may be necessary.

The second deflexion element and the fourth deflexion element are fixed to the frame structure at the same height particularly mean that if the second seesaw element is in a balanced orientation, the extension between the fixation of the second belt element on the first end of the second seesaw element and the second deflexion element and the extension between the fixation of the fourth belt element on the second end of the second seesaw element and the fourth deflexion element are equal. Hence, the second belt element and the fourth belt element may be provided identical and fixed to two different positions on the first section of the frame structure and the second seesaw element. Therefore, lower manufacturing costs may be necessary.

According to a further exemplary embodiment of the present invention, the fifth height and the sixth height are equal.

When the fifth height and the sixth height are equal and at the same time the first height equals the second height as well as the third height equals the fourth height, all four of the belt elements may be manufactured identical. Therefore, the manufacturing costs of the belt elements may be further reduced because by solely one single manufacturing process, all needed belt elements may be produced.

According to a further exemplary embodiment of the present invention, the fifth height is larger than the first height, and/or the sixth height is larger than the second height.

By the fifth height being larger than the first height, the first seesaw element may be pivotably fixed to the first section of the frame structure at a point being nearer to the support area than the first deflexion element and the third deflexion element, respectively.

By the sixth height being larger than the second height, the second seesaw element may be pivotably fixed to the second section of the frame structure at a point being nearer to the support area than the second deflexion element and the fourth deflexion element, respectively.

The belt element extends from one end of the seesaw element in the upright direction to the deflexion element, is deflected around the deflexion element and fixed to the spaced apart section of the frame structure. Hence, the wind turbine blade may be supported evenly by the different belt elements because the tension in the belt elements is balanced out and equalized automatically.

Additionally, by providing all of the belt elements identical, when the wind turbine blade is supported by the support structure, the first seesaw element and the second seesaw element may each equalize the loads acting on two respective belt elements. Therefore, the same tension may be present in every one of the four belt elements. Particularly, there may no tension or forces act on the wind turbine blade. Hence, potential costs due to damages caused by conventional support structures on the wind turbine blade may be omitted.

According to a further exemplary embodiment of the present invention, seen in a second direction of the support structure being perpendicular to the first direction, the first end of the second seesaw element and the second end of the second seesaw element are arranged in-between the first end of the first seesaw element and the second end of the first seesaw element, or seen in a second direction of the support structure being perpendicular to the first direction, the first end of the first seesaw element and the second end of the first seesaw element are arranged in-between the first end of the second seesaw-element and the second end of the second seesaw element.

The second direction may be seen as a longitudinal extension of the support structure being parallel to a longitudinal extension of the wind turbine blade from a wind turbine root to a wind turbine tip, when the wind turbine blade is inserted in the support structure.

By arranging the belt elements such that two belt elements which are fixed to the same seesaw element are arranged in-between two belt element which are fixed to the other seesaw element, the supported wind turbine blade may particularly be prevented from a torsional horizontal movement.

According to a further exemplary embodiment of the present invention, the first end of the first seesaw element, the first deflexion element and a fixation of the second end of the first belt element are arranged on a first imaginary line being perpendicular to a support area of the support structure, and/or the second end of the first seesaw element, the third deflexion element and a fixation of the second end of the third belt element are arranged on a third imaginary line being perpendicular to the support area, and/or the first end of the second seesaw element, the second deflexion element and a fixation of the second end of the second belt element are arranged on a second imaginary line being perpendicular to the support area, and/or the second end of the second seesaw element, the fourth deflexion element and a fixation of the second end of the fourth belt element are arranged on a fourth imaginary line being perpendicular to the support area.

The imaginary line may extend in the direction of the height and may extend perpendicular to the support area. Hence, seen in a side view having a normal being parallel to the first direction, the imaginary line may be a straight line. Additionally, the first end of the belt element, the deflexion element and the second end of the belt element may have the same longitudinal position seen in the second direction.

The first imaginary line, the second imaginary line, the third imaginary line, and the fourth imaginary line may have different longitudinal positions seen in the second direction. Therefore, the first imaginary line, the second imaginary line, the third imaginary line, and the fourth imaginary line are distanced each with respect to another.

Seen in the side view, either the second imaginary line and the fourth imaginary line may be adjacent to each other and may be delimited on the outer sides seen in the second direction by the first imaginary line and the third imaginary line, respectively, or the first imaginary line and the third imaginary line may be adjacent to each other and may be delimited on the outer sides seen in the second direction by the second imaginary line and the fourth imaginary line, respectively.

Therefore, a horizontal torsion of the supported wind turbine blade may be sup-pressed.

Furthermore, by arranging the first end of the belt element, the first deflexion of the belt element and the second end of the belt element on one imaginary line, the belt element may be guided in one plane having a normal being parallel to the second direction. Hence, the belt element may be evenly loaded and therefore less prone to wear and may have a longer service life.

According to a further exemplary embodiment of the present invention, the first end of the first belt element is fixed to the first end of the first seesaw element by a pivotable joint such that the first end of the first belt element is pivotable around an axis of rotation being parallel to the first pivoting axis, and/or the first end of the third belt element is fixed to the second end of the first seesaw element by a pivotable joint such that the first end of the third belt element is pivotable around an axis of rotation being parallel to the first pivoting axis. Alternatively or supplementary, the first end of the second belt element is fixed to the first end of the second seesaw element by a pivotable joint such that the first end of the second belt element is pivotable around an axis of rotation being parallel to the second pivoting axis, and/or the first end of the fourth belt element is fixed to the second end of the second seesaw element by a pivotable joint such that the first end of the fourth belt element is pivotable around an axis of rotation being parallel to the second pivoting axis.

The axis of rotation being parallel to the pivoting axis may according to the present application mean that the axis of rotation is spaced apart from the pivoting axis in the second direction, and at the same time may extend parallel to the first direction.

When the seesaw element makes a pivoting movement around the pivoting axis for balancing different tensions in the two belt elements fixed to the seesaw element, the ends of the two belt elements each make a movement in the second direction as well cause by the seesawed fixation of the seesaw element. These movements may be equalized by the pivotable joint because the respective end of the belt element may pivot around the respective axis of rotation. Therefore, a guiding of each belt element in a straight plane having a normal being parallel to the second direction may be ensured.

According to a further exemplary embodiment of the present invention, the first end of the first belt element is fixed to the first end of the first seesaw element by a further pivotable joint such that the first end of the first belt element is pivotable around a further axis of rotation being perpendicular to the first pivoting axis, and extending parallel to a support area of the support structure, and/or the first end of the third belt element is fixed to the second end of the first seesaw element by a further pivotable joint such that the first end of the second belt element is pivotable around a further axis of rotation being perpendicular to the first pivoting axis, and extending parallel to the support area. Additionally or supplementary, the first end of the second belt element is fixed to the first end of the second seesaw element by a further pivotable joint such that the first end of the second belt element is pivotable around a further axis of rotation being perpendicular to the second pivoting axis, and extending parallel to the support area, and/or the first end of the fourth belt element is fixed to the second end of the second seesaw element by a further pivotable joint such that the first end of the fourth belt element is pivotable around a further axis of rotation being perpendicular to the second pivoting axis, and extending parallel to the support area.

The further pivotable joint may balance out any potential movement of the end of the belt element fixed to the seesaw element in the first direction. Therefore, the belt element may at all times be guided in a straight plane between the end of the seesaw element and the deflexion element. The straight plane may in this case have a normal being parallel to the first direction.

Particularly, the further pivotable joint may reduce an uneven load of the belt element and therefore may increase the service life of the belt element.

It has to be noted that embodiments of the invention have been described with reference to different subject-matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject-matter also any combination between features relating to different subject-matters, in particular between features of the apparatus type claims and features of the method type claims is considered as to be disclosed with this application.

BRIEF DESCRIPTION

Some of the embodiments will be described in detail, with reference to the following figures, wherein like designations denote like members, "where in:

DETAILED DESCRIPTION

Figure 1:
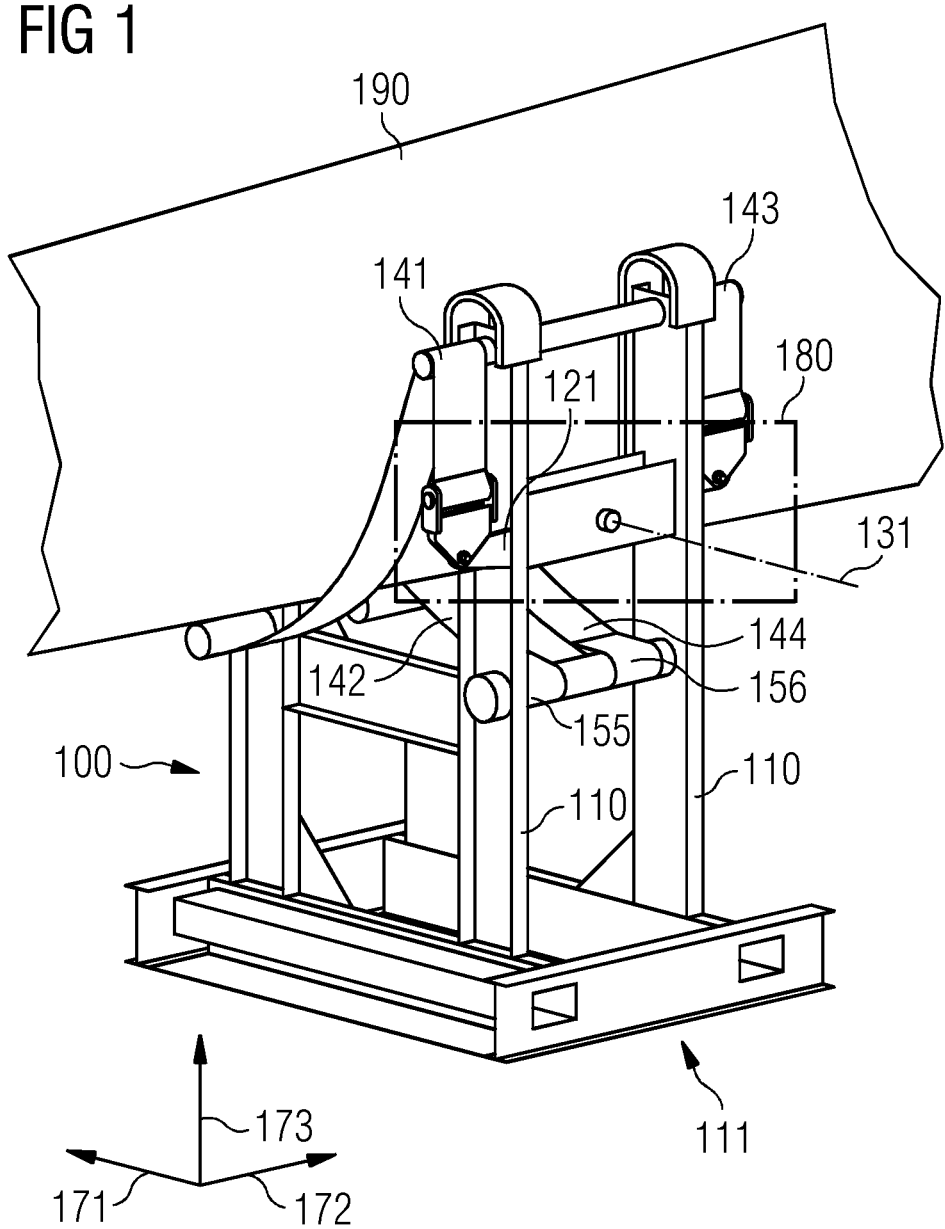
FIG. 1 shows a perspective view of the first section of the support structure supporting a wind turbine blade according to an exemplary embodiment.

The illustrations in the drawings are schematically. It is noted that in different figures, similar or identical elements are provided with the same reference signs.

FIG. 1 to FIG. 4 shown one exemplary embodiment of the present invention.

FIG. 1 shows a perspective view of the first section 111 of the support structure 100 supporting a wind turbine blade 190 according to an exemplary embodiment.

The first seesaw element 121 is pivotably fixed to the first section 111 of the frame structure 110 by a first pivoting axis 131. A section of the wind turbine blade 190 is arranged in-between the first section 111 and the second section 312 (shown in detail in FIG. 3). The first belt element 141 and the third belt element 143 are fixed to two spaced apart ends of the first seesaw element 121. The longitudinal extension of the first seesaw element 121 extends along the second direction 172. The second end 155 of the second belt element 142 is fixed to the first section 111 adjacent to the second end 156 of the fourth belt element 144. The mechanism of the first seesaw element 121 is shown in detail in the detail 180 in FIG. 2.

Additionally, the height of the support structure 100 is indicated as the third direction 173, and extends perpendicular to the first direction 171 and the second direction 172.

Figure 2:
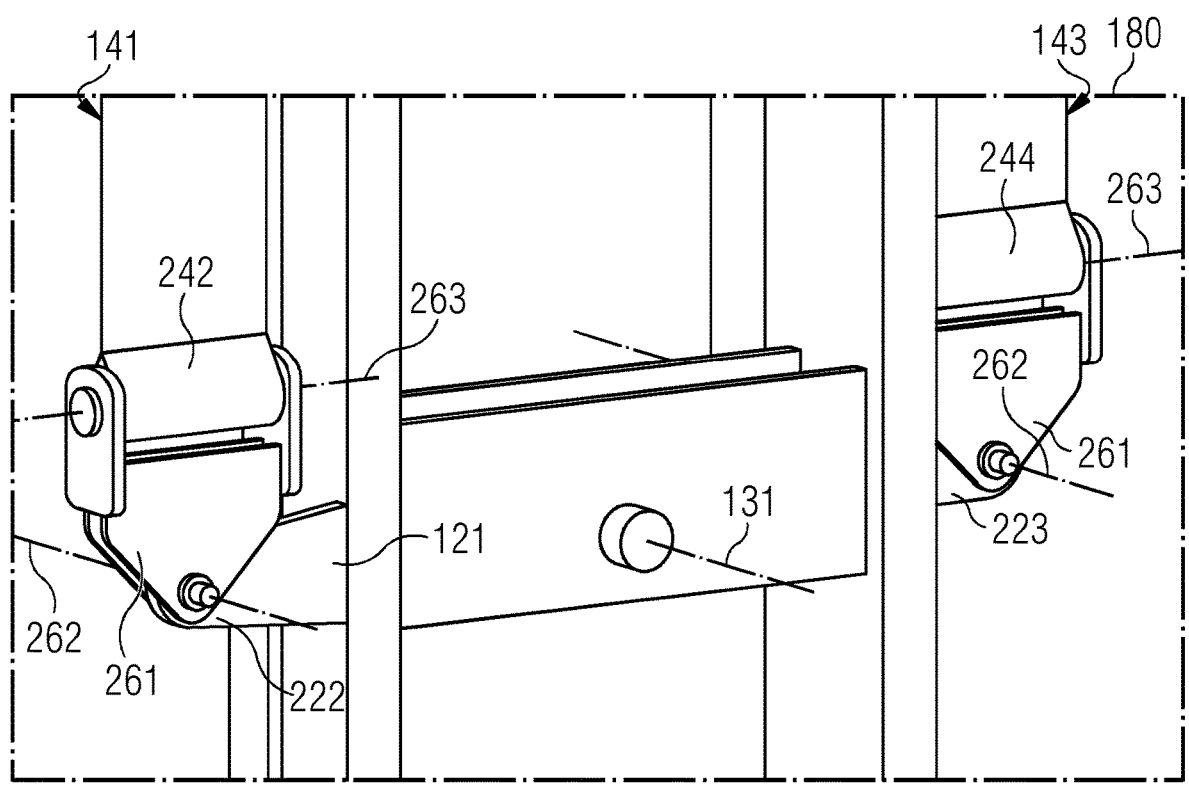
FIG. 2 shows a detailed view of the detail shown in FIG. 1 according to an exemplary embodiment.

FIG. 2 shows a detailed view of the detail 180 shown in FIG. 1 according to an exemplary embodiment.

The first seesaw element 121 is pivotably fixed to the first section 111 and may pivot around the first pivoting axis 131. The first pivoting axis 131 extends parallel to the first direction 171. The first end 242 of the first belt element 141 is fixed to the first end 222 of the seesaw element 121 by a pivotable joint 261. The pivotable joint comprises an axis of rotation 262 extending parallel to the first direction 171, and a further axis of rotation 263 extending parallel to the second direction 172. The first end 244 of the third belt element 143 is fixed to the second end 223 of the first seesaw element 121 by the pivotable joint 261 being identical to the pivotable joint 261 on the first end 222 of the first seesaw element 121. By a pivoting movement of the first belt element 141 and the third belt element 143, respectively, around the first pivoting axis 131, the first end 242 of the first belt element 141 and the first end 244 of the third belt element 143, respectively, may pivot around the rotation axis 262 and the further rotation axis 263.

Figure 3:
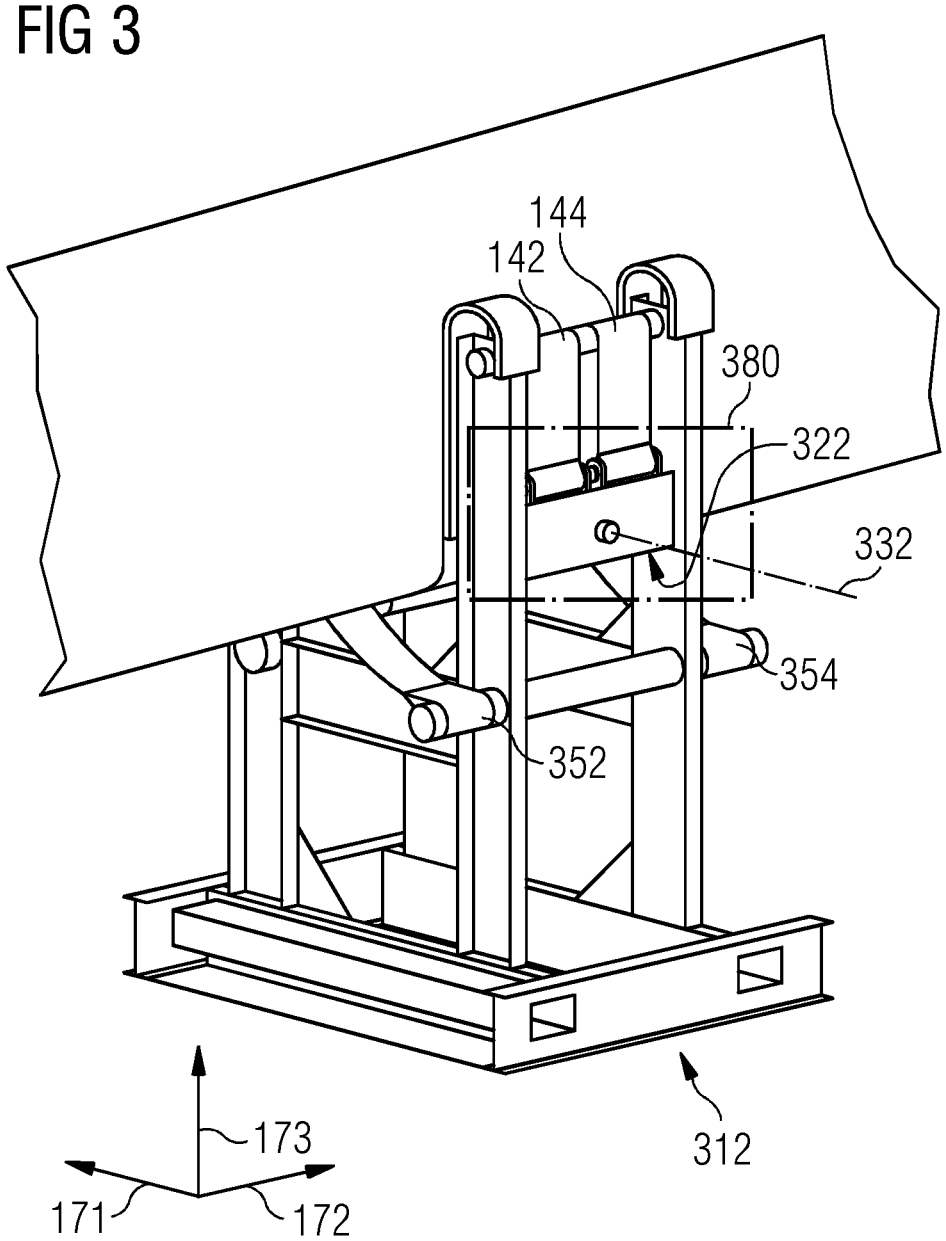
FIG. 3 shows a perspective view of the second section of the support structure supporting a wind turbine blade according to an exemplary embodiment.

FIG. 3 shows a perspective view of the second section 312 of the support structure 100 supporting a wind turbine blade 190 according to an exemplary embodiment.

The second seesaw element 322 is pivotably fixed to the second section 312 of the frame structure 110 by a second pivoting axis 332. A section of the wind turbine blade 190 is arranged in-between the first section 111 (shown in detail in FIG. 1) and the second section 312. The second belt element 142 and the fourth belt element 144 are fixed to two spaced apart ends of the second seesaw element 322. The longitudinal extension of the second seesaw element 322 extends in a balanced orientation along the second direction 172, and parallel to the longitudinal extension of the first seesaw element 121 in a balanced orientation. The second end 352 of the first belt element 141 is fixed to the second section 312 spaced apart relatively to the second end 354 of the third belt element 143. The mechanism of the second seesaw element 322 is shown in detail in the detail 380 in FIG. 4.

Figure 4:
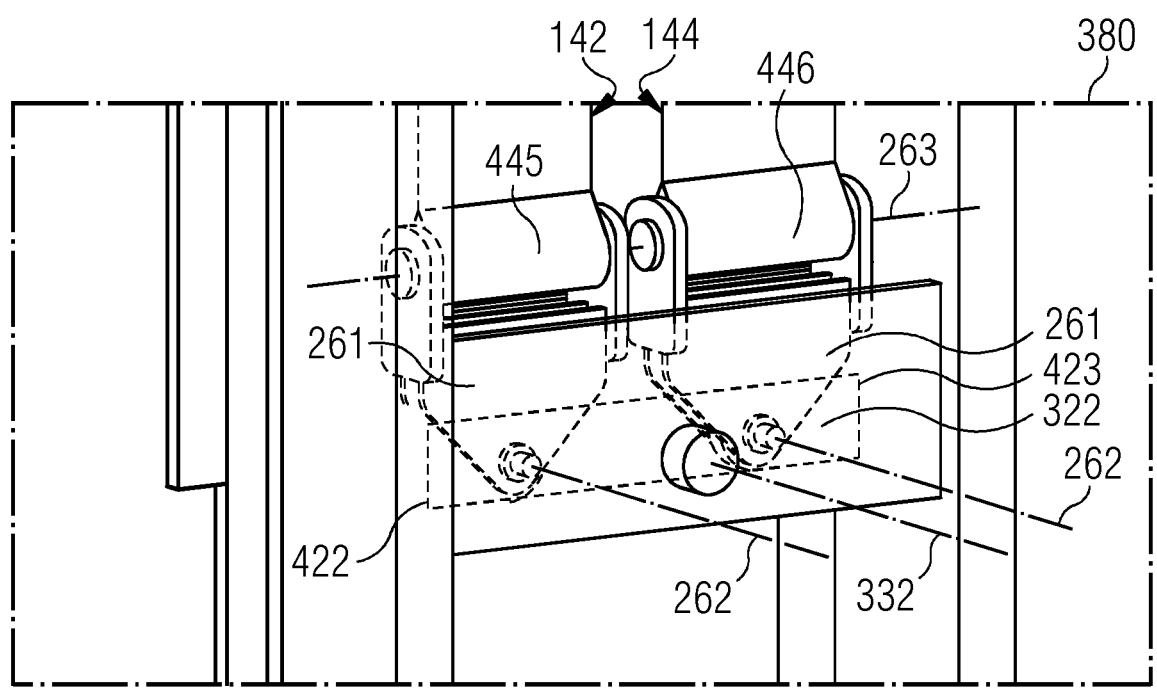
FIG. 4 shows a detailed view of the detail shown in FIG. 3 according to an exemplary embodiment.

FIG. 4 a detailed view of the detail 380 shown in FIG. 3 according to an exemplary embodiment.

The second seesaw element 322 is arranged inside of a connecting structure of the second section 312. Therefore, the second seesaw element 322 and the two pivotable joints 261 are illustrated in dashed lines in FIG. 4.

The second seesaw element 322 is pivotably fixed to the second section 312, and may pivot around the second pivoting axis 332. The second pivoting axis 332 extends parallel to the first direction 171. The first end 445 of the second belt element 142 is fixed to the first end 422 of the second seesaw element 322 by a pivotable joint 261. The pivotable joint 261 comprises an axis of rotation 262 extending parallel to the first direction 171, and a further axis of rotation 263 extending parallel to the second direction 172. The first end 446 of the fourth belt element 144 is fixed to the second end 423 of the second seesaw element 322 by the pivotable joint 261 being identical to the pivotable joint 261 on the first end 422 of the second seesaw element 322. By a pivoting movement of the second belt element 142 and the fourth belt element 144, respectively, around the second pivoting axis 332, the first end 446 of the fourth belt element 144 and the first end 445 of the second belt element 142, respectively, may pivot around the axis of rotation 262 and the further axis of rotation 263.

Figure 5:
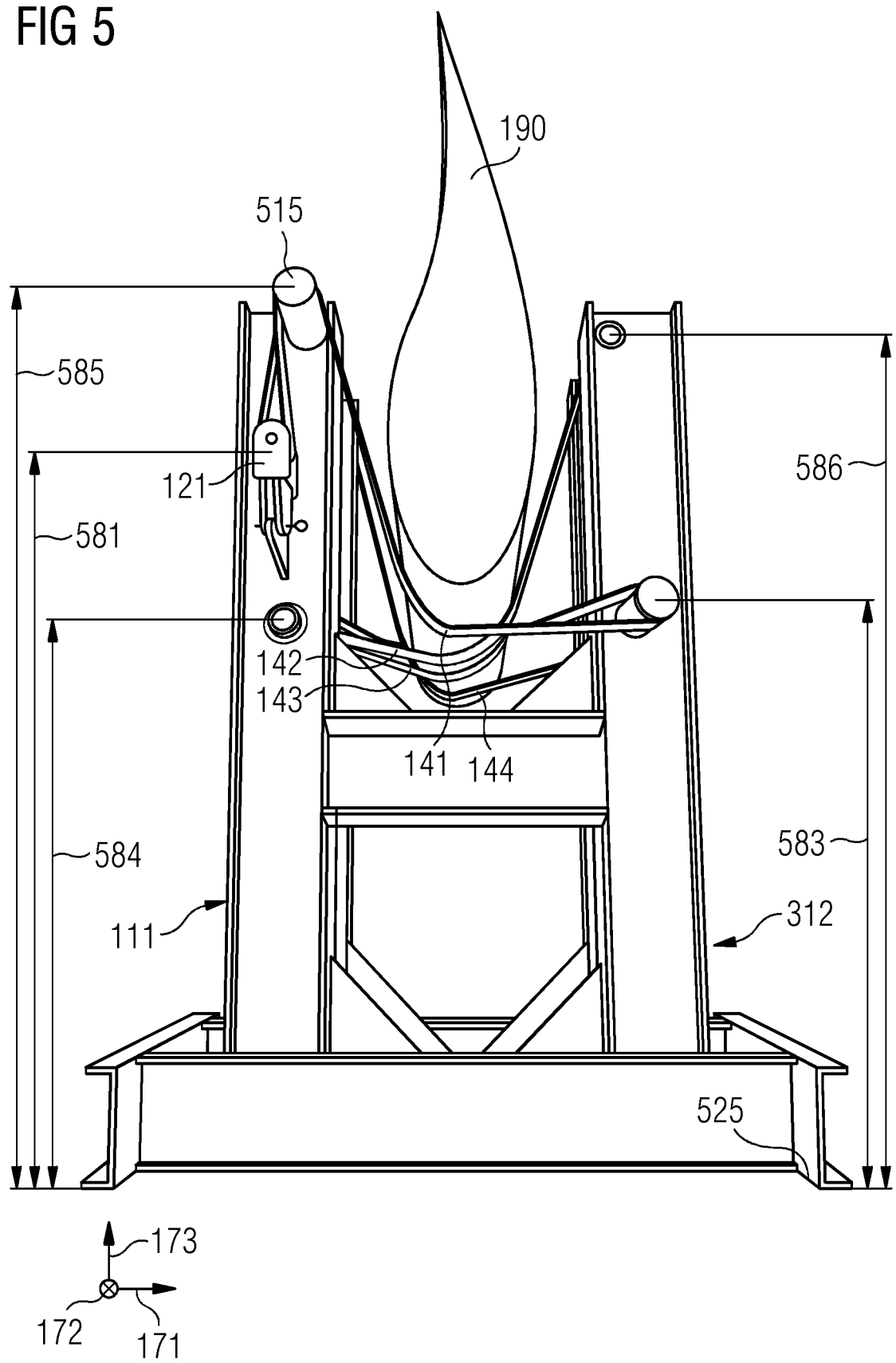
FIG. 5 shows a side view seen in the second direction of the support structure supporting a wind turbine blade according to an exemplary embodiment.

FIG. 5 shows a side view seen in the second direction 172 of the support structure 100 supporting a wind turbine blade 190 according to an exemplary embodiment.

The first deflexion element 515 is fixed to the first section 111 at the fifth height 585. The starting point where the second deflexion element 717 is fixed to the second section 312 (shown in detail in FIG. 7) is arranged at a sixth height 586. The fifth height 585 and the sixth height 586 are equal. The height is measured in the third direction 173, and is perpendicular to the support area 525. The first pivoting axis 131 is arranged at the first section 111 at the first height 581 which is smaller than the fifth height 585. The second end 155 of the second belt element 142 is fixed to the first section 111 at the fourth height 584.

The second end 352 of the first belt element 141 is fixed to the second section 312 at the third height 583. As may be seen in FIG. 5, the third height 583 and the fourth height 584 are equal. Therefore, the first belt element 141 and the second belt element 142, respectively, extend in a parabolic shape such that the wind turbine blade 190 may be fixedly held in place and may not pivotably move around an axis being parallel to the second direction 172.

Furthermore, by a movement of the first seesaw element 121 and the second seesaw element 322, the tension in each of the first belt element 141, the second belt element 142, the third belt element 143, and the fourth belt element 144 is equalized automatically and without any help from a technician.

Figure 6:
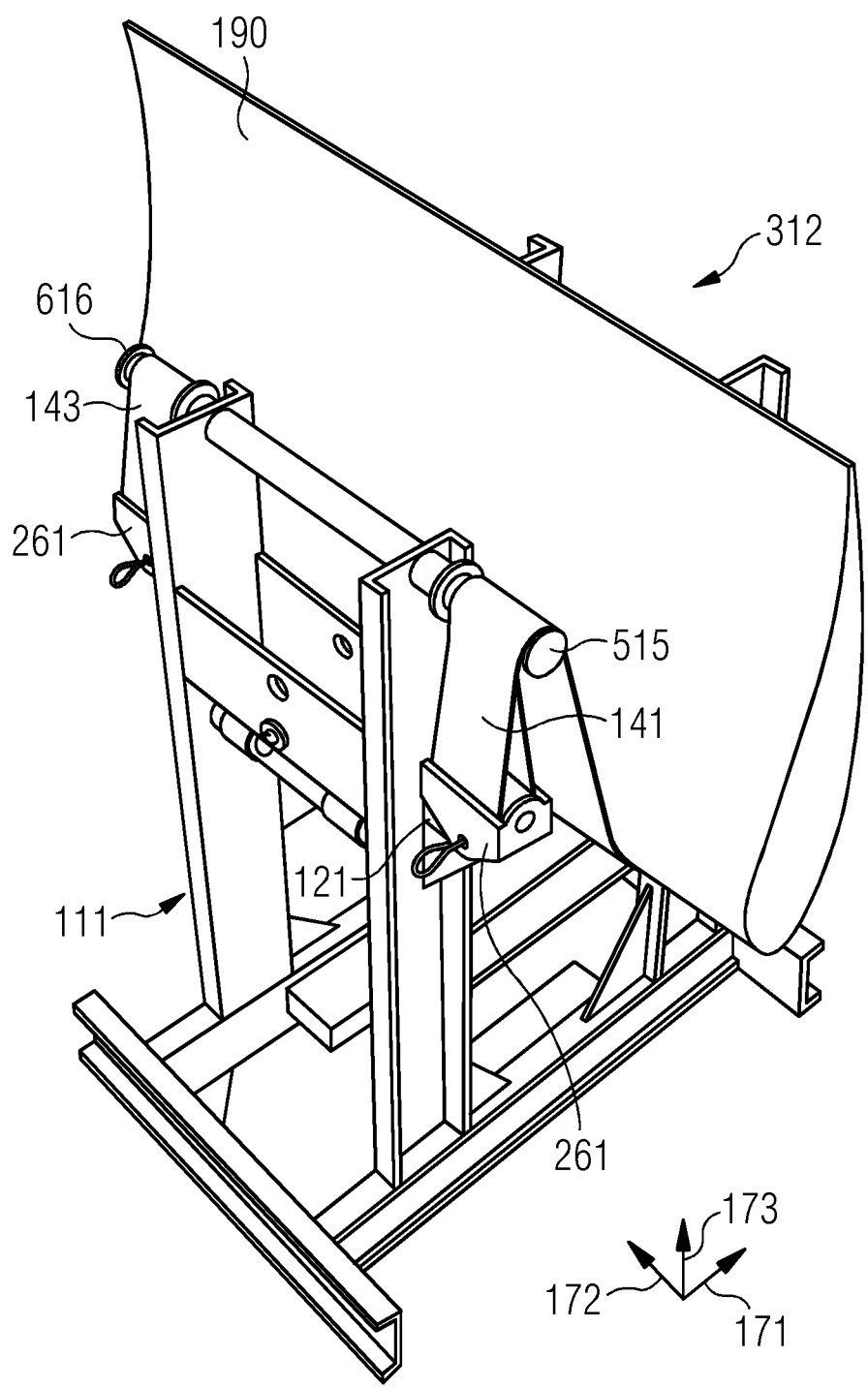
FIG. 6 shows a perspective view of the support structure supporting a wind turbine blade according to an exemplar embodiment.

FIG. 6 shows a perspective view of the support structure 100 supporting a wind turbine blade 190 according to an exemplar embodiment.

As shown in FIG. 6, the first belt element 141 and the third belt element 143 are each fixed to one end of the first seesaw element 121 by a sling around a portion of the respective pivotable joint 261. At the fifth height 585 (shown in FIG. 5), there are the first deflexion element 515 and the third deflexion element 616 fixed to the first section 111. The first deflexion element 515 is formed as a round nose extending from the first section 111. The third deflexion element 616 is formed as a respective round nose extending from the first section 111 in the second direction 172 and in the opposite direction as the first deflexion element 515.

Figure 7:
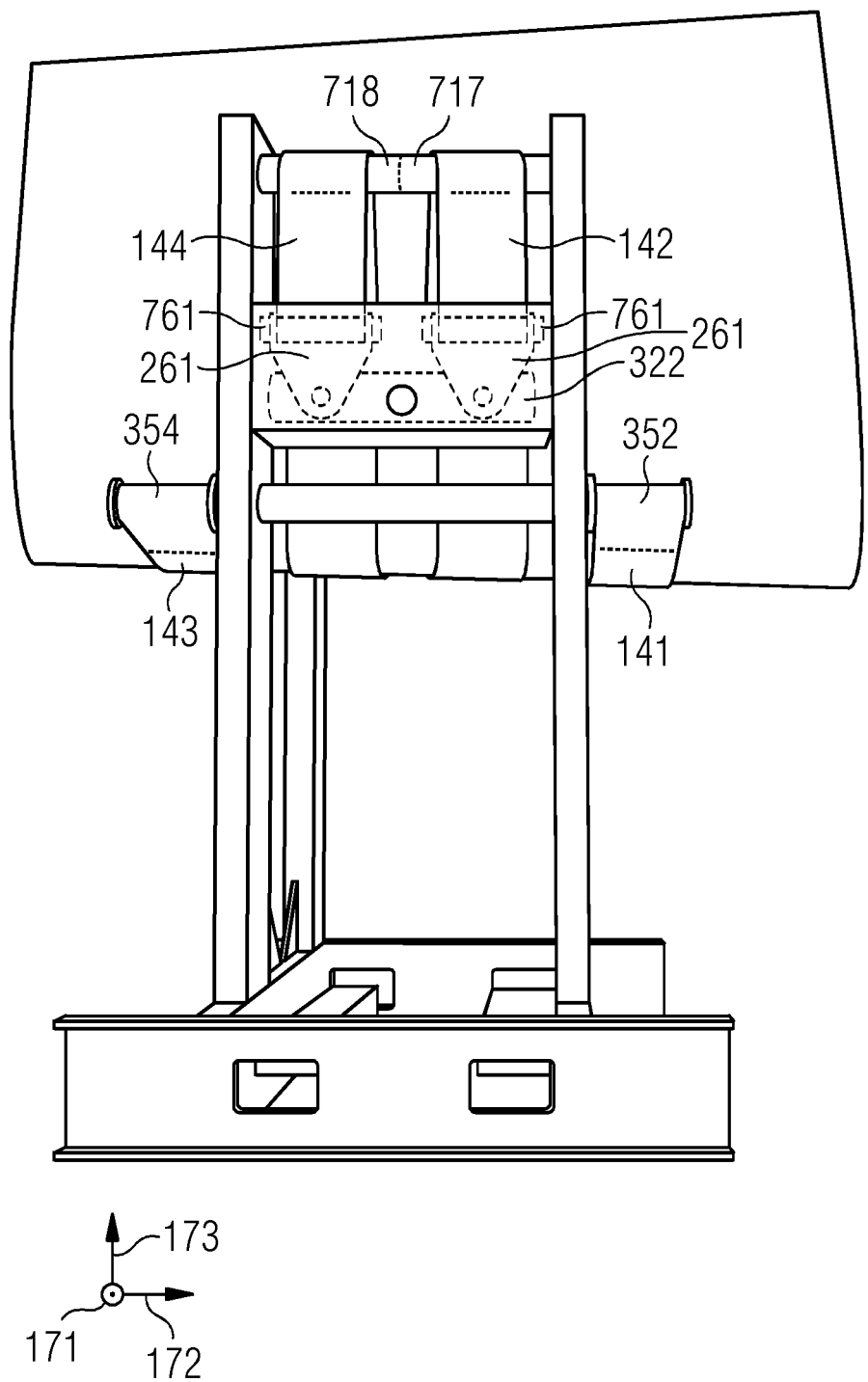
FIG. 7 shows a side view seen in the first direction of the support structure supporting a wind turbine blade according to an exemplary embodiment.

FIG. 7 shows a side view seen in the first direction 171 of the support structure 100 supporting a wind turbine blade 190 according to an exemplary embodiment.

The second end 352 of the first belt element 141 is fixed to the second section 312 by a round nose extending from the second section 312 of the frame structure 110 in the direction of the second direction 172. Furthermore, the second end 354 of the third belt element 143 is fixed to the second section 312 by a round nose extending from the second section 312 of the frame structure 110 in the second direction 172, and in the opposing direction of the nose where the second end 352 of the first belt element 141 is fixed. The first belt element 141 and the third belt element 143 are each fixed to the respective nose by a sling formed in the first belt element 141 and the third belt element 143, respectively.

Shown in dashed lines is the second seesaw element 322 which is arranged inside a portion of the second section 312. The second belt element 142 and the fourth belt element 144, respectively, is fixed to the second seesaw element 322 by the respective pivotable joint 261 and the further respective pivotable joint 761.

The second belt element 142 is fixed to the second seesaw element 322 by a sling formed around the further pivotable joint 761 and the further pivotable joint 761 being pivotably joined to the pivotable joint 261. The pivotable joint 261 is further pivotably fixed to the second seesaw element 322.

Additionally, as shown in FIG. 7 the second deflexion element 717 and the fourth deflexion element 718 are formed as a common round bar extending parallel to the second direction 172, and between two different parts of the second section 312.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A support structure for a wind turbine blade comprising:
   a frame structure comprising a first section and a second section which are spaced apart with respect to each other along a first direction such that a section of a wind turbine blade is arrangeable in-between the first section and the second section;
   a first seesaw element being pivotably fixed to the first section, and having a first pivoting axis parallel to the first direction;
   a second seesaw element being pivotably fixed to the second section, and having a second pivoting axis parallel to the first direction;
   a first belt element being fixed with a first end of the first belt element to a first end of the first seesaw element;
   a second belt element being fixed with a first end of the second belt element to a first end of the second seesaw element;
   a third belt element being fixed with a first end of the third belt element to a second end of the first seesaw element and
   a fourth belt element being fixed with a first end of the fourth belt element to a second end of the second seesaw element;
     wherein the first end and the second end of the first seesaw element are on opposite sides relatively to the first pivoting axis;
     wherein the first end and the second end of the second seesaw element are on opposite sides relatively to the second pivoting axis;
     wherein a second end of the first belt element and a second end of the third belt element are each fixed to the second section of the frame structure, and a second end of the second belt element and a second end of the fourth belt element are each fixed to the first section of the frame structure.

2. The support structure according to claim 1, wherein the second pivoting axis is arranged at the second section of the frame structure at a second height with respect to a support area of the support structure further wherein the second end of the second belt element is fixed to the first section of the frame structure at a fourth height with respect of the support area and the second end of the fourth belt element is fixed to the first section of the frame structure at the fourth height and the second height is larger than the fourth height.

3. The support structure according to claim 2, wherein the first height and the second height are equal, and the third height and the fourth height are equal.

4. The support structure according to claim 1, wherein the first pivoting axis is arranged at the first section of the frame structure at a first height with respect to a support area of the support structure further wherein the second end of the first belt element is fixed to the second section of the frame structure at a third height with respect to the support area, and the second end of the third belt element is fixed to the second section of the frame structure at the third height and the first height is larger than the third height.

5. The support structure according to claim 1, further comprising:
   a second deflexion element for deflecting the second belt element and
   a fourth deflexion element for deflecting the fourth belt element,
     wherein the second belt element extends from the first end of the second seesaw element (322) deflected around the second deflexion element to the first section, and
     wherein the fourth belt element extends from the second end of the second seesaw element deflected around the fourth deflexion element to the first section.

6. The support structure according to claim 1, wherein seen in a second direction of the support structure being perpendicular to the first direction, the first end of the second seesaw element and the second end of the second seesaw element are arranged in-between the first end of the first seesaw element and the second end of the first seesaw element, or
   wherein seen in a second direction of the support structure being perpendicular to the first direction, the first end of the first seesaw element and the second end of the first seesaw element are arranged in-between the first end of the second seesaw-element and the second end of the second seesaw element.

7. The support structure according to claim 1, wherein the first end of the first belt element is fixed to the first end of the first seesaw element by a pivotable joint such that the first end of the first belt element is pivotable around an axis of rotation being parallel to the first pivoting axis, wherein the first end of the third belt element is fixed to the second end of the first seesaw element by a pivotable joint such that the first end of the third belt element is pivotable around an axis of rotation being parallel to the first pivoting axis, wherein the first end of the second belt element is fixed to the first end of the second seesaw element by a pivotable joint such that the first end of the second belt element is pivotable around an axis of rotation being parallel to the second pivoting axis, and
   wherein the first end of the fourth belt element is fixed to the second end of the second seesaw element by a pivotable joint such that the first end of the fourth belt element is pivotable around an axis of rotation being parallel to the second pivoting axis.

8. The support structure according to claim 1, wherein the first end of the first belt element is fixed to the first end of the first seesaw element by a further pivotable joint such that the first end of the first belt element is pivotable around a further axis of rotation being perpendicular to the first pivoting axis, and extending parallel to a support area of the support structure, wherein the first end of the third belt element is fixed to the second end of the first seesaw element by a further pivotable joint such that the first end of the second belt element is pivotable around a further axis of rotation being perpendicular to the first pivoting axis, and extending parallel to the support area, wherein the first end of the second belt element is fixed to the first end of the second seesaw element by a further pivotable joint such that the first end of the second belt element is pivotable around a further axis of rotation being perpendicular to the second pivoting axis, and extending parallel to the support area, wherein the first end of the fourth belt element is fixed to the second end of the second seesaw element by a further pivotable joint such that the first end of the fourth belt element is pivotable around a further axis of rotation being perpendicular to the second pivoting axis, and extending parallel to the support area.

9. The support structure according to claim 1, further comprising:
   a first deflexion element for deflecting the first belt element; and
   a third deflexion element for deflecting the third belt element;
      wherein the first belt element extends from the first end of the first seesaw element deflected around the first deflexion element to the second section; and
      wherein the third belt element extends from the second end of the first seesaw element deflected around the third deflexion element to the second section.

10. The support structure according claim 9, wherein the first end of the first seesaw element, the first deflexion element and a fixation of the second end of the first belt element are arranged on a first imaginary line being perpendicular to a support area of the support structure, and
   wherein the second end of the first seesaw element, the third deflexion element and a fixation of the second end of the third belt element are arranged on a third imaginary line being perpendicular to the support area, wherein the first end of the second seesaw element, the second deflexion element and a fixation of the second end of the second belt element are arranged on a second imaginary line being perpendicular to the support area, wherein the second end of the second seesaw element, the fourth deflexion element and a fixation of the second end of the fourth belt element are arranged on a fourth imaginary line being perpendicular to the support area.

11. The support structure according to claim 9, wherein the first deflexion element and the third deflexion element are fixed to the frame structure at a fifth height with respect to a support area of the support structure, and
   wherein the second deflexion element and the fourth deflexion element are fixed at the frame structure at a sixth height with respect to the support area.

12. The support structure according to claim 11, wherein the fifth height and the sixth height are equal.

13. The support structure according to claim 11, wherein the fifth height is larger than the first height, and wherein the sixth height is larger than the second height.

14. A method for manufacturing a support structure for a turbine blade, comprising:
   providing a frame structure comprising a first section and a second section which are spaced apart with respect to each other along a first direction such that a section of a turbine blade is arrangeable in-between the first section and the second section;
   pivotably fixing a first seesaw element to the first section, wherein the first seesaw element has a first pivoting axis parallel to the first direction;
   pivotably fixing a second seesaw element to the second section, wherein the second seesaw element has a second pivoting axis parallel to the first direction;
   fixing a first belt element with a first end of the first belt element to a first end of the first seesaw element;
   fixing a second belt element with a first end of the second belt element to a first end of the second seesaw element;
   fixing a third belt element with a first end of the third belt element to a second end of the first seesaw element; and
   fixing a fourth belt element with a first end of the fourth belt element to a second end of the second seesaw element;
      wherein the first end and the second end of the first seesaw element are on opposite sides relatively to the first pivoting axis;
      wherein the first end and the second end of the second seesaw element are on opposite sides relatively to the second pivoting axis;
   wherein a second end of the first belt element and a second end of the third belt element are each fixed to the second section of the frame structure, and a second end of the second belt element and a second end of the fourth belt element are each fixed to the first section of the frame structure.

15. The method for transportation and storage of a wind turbine blade, wherein the wind turbine blade is supported by a support structure according to claim 1.

* * * * *